United States Patent [19]

McClellan, III et al.

[11] Patent Number: 4,503,562
[45] Date of Patent: Mar. 5, 1985

[54] MAINTAINING FREQUENCY ACCURACY IN SINGLE SIDEBAND REPEATERS

[75] Inventors: W. Roy McClellan, III, Dallas; Richard J. Girvin; William A. Conner, both of Plano, all of Tex.

[73] Assignee: Rockwell International Corporation, El Segundo, Calif.

[21] Appl. No.: 480,155

[22] Filed: Mar. 29, 1983

[51] Int. Cl.³ .............................................. H04B 7/14
[52] U.S. Cl. .................................... 455/22; 455/315; 331/2; 328/14
[58] Field of Search .............................. 455/7, 20–22, 455/51, 76, 260, 265, 314–316; 331/2, 55; 328/14, 72

[56] References Cited

U.S. PATENT DOCUMENTS 3,480,883  11/1969  Gaunt, Jr. ................................ 331/2
4,035,833   7/1977  Shepard ................................ 455/260
4,140,972   2/1979  Enriquez et al. .................... 455/265
4,293,825  10/1981  Cerra ....................................... 455/22

Primary Examiner—Jin F. Ng
Attorney, Agent, or Firm—V. Lawrence Sewell; Howard R. Greenberg; H. Fredrick Hamann

[57] ABSTRACT

A system for maintaining an accurate frequency source in a single sideband repeater employs an ultra stable station control reference (SCR) frequency generator. A first frequency synthesizer for a local oscillator of the repeater phase locks to the output of the SCR normally, but is free running upon failure of the SCR. A second frequency synthesizer for another local oscillator phase locks to the output of the first synthesizer. Upon failure of the SCR, the system of synthesizers can provide a satisfactory frequency reference for the repeater. Disclosed are phase lock loop filter time constant design considerations for achieving proper operation.

5 Claims, 2 Drawing Figures

MAINTAINING FREQUENCY ACCURACY IN SINGLE SIDEBAND REPEATERS

BACKGROUND OF THE INVENTION

The present invention relates to a system for maintaining an accurate frequency source in a single sideband AM radio repeater station.

In single sideband AM radio, since no carrier is present, frequency errors at IF and RF appear as direct errors at the voice frequency. Therefore, maintaining an accurate reference frequency is essential.

An approach to achieving frequency accuracy throughout the system is to improve the long term stability of all translation carriers by means of external reference. Another approach uses techniques by which long term stability of the transmit and receive ends can be coupled to each other by the transmission of appropriate pilots. The present invention represents a part of a system in which overall transmission error is reduced to a small, but non-zero amount, enabling the IF demodulator at the receive terminal to be phase locked to a voltage-controlled crystal oscillator, resulting in essentially error free baseband.

One system for establishing the receive and transmitter frequencies in a repeater station begins with generating a microwave signal at 6 GHz. A sample of the microwave signal is mixed with a 252 MHz signal to produce a receive frequency 252 MHz away from the transmit frequency. This type of system has disadvantages associated with it. Since the frequency generation is done at microwave frequency, and communication is by means of waveguide, it is important that the transmitter and receiver be colocated. Further, there are occasions when the standard frequency differential between transmitter and receiver is not available, for example, because one of the frequencies has been preempted. Changing the frequencies of operation in this type of system is an expensive undertaking.

SUMMARY OF THE INVENTION

In the present invention, a single sideband repeater station has one ultra stable station control reference (SCR) frequency generator. There is a frequency synthesizer for one of the local oscillators, for example the transmit local oscillator, which phase locks to the output of the SCR frequency generator in normal operation. If the SCR frequency generator fails, the frequency synthesizer has the capability of free running temporarily with a satisfactory frequency accuracy. A second frequency synthesizer, for example, for the receive local oscillator, is phase locked to the output of the first synthesizer. As a result, the repeater can satisfactorily receive and transmit temporarily, while the SCR frequency generator has failed.

It is a feature of the invention, that the frequency synthesizers have loop filters such that the second frequency synthesizer tracks with a faster time constant than the first synthesizer.

The frequency system of the present invention provides several advantages. The principal advantage is that the system is able to continue operation after SCR failure, but does not require a standby SCR frequency generator.

There are additional advantages of the present invention, as compared to the system described above in which the transmit and receive frequency differential involves mixing a microwave frequency. Since the connection between the transmitter and receiver in the present invention is at 247 KHz, the transmitter and receiver do not have to be colocated. They can conveniently be interconnected by a cable carrying the 247 KHz signal.

Moreover, if the frequency differential between transmitter and receiver must be nonstandard, the change is relatively straightforward in the present system. A different crystal is used in each synthesizer of the invention which is to have a different frequency, and straps are changed which change the frequency divider ratio following the crystal.

Further, as compared to generating at a microwave frequency and mixing, the present invention provides an immunity to spurious tones.

DESCRIPTION OF A PREFERRED EMBODIMENT

Figure 1:
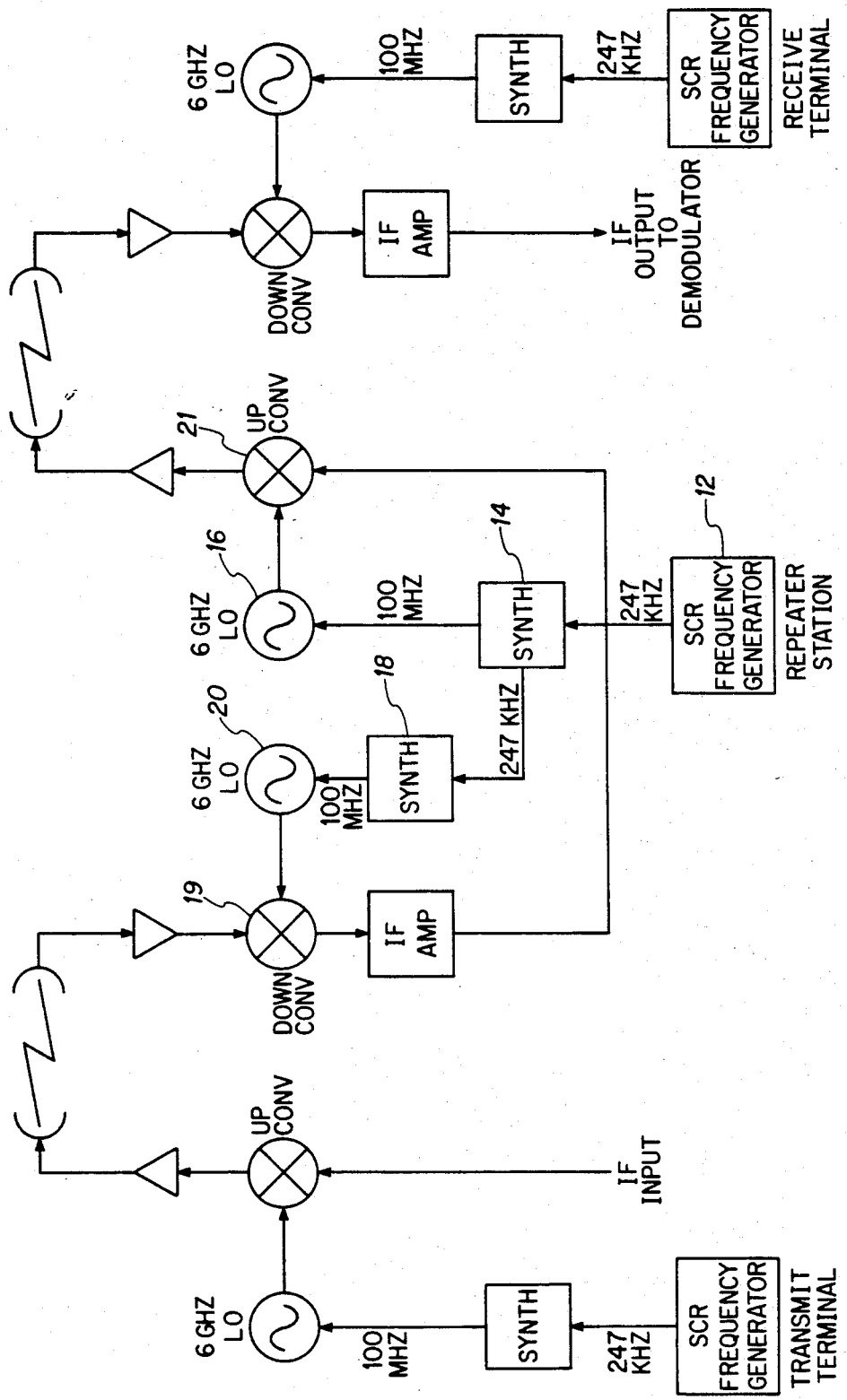
FIG. 1 is a block diagram of a radio system, illustrating a repeater frequency system in accordance with the invention.

FIG. 1 illustrates the frequency generation aspects of an AM single sideband radio system, including a transmit terminal, repeater station and receive terminal. Each portion of the total system is referenced to a station control reference (SCR) frequency generator. The frequency stability of such a generator must be very high, for example, $\pm 3 \times 10^{-10}$ parts per day and $\pm 5 \times 10^{-8}$ parts per year. In the receive and transmit terminals, the SCR frequency generators have a hot standby unit, not shown in the drawing. In the repeater station, however, because of the present invention, a standby SCR frequency generator is not required.

In the repeater station, the output of the sole SCR frequency generator 12 is connected to transmit frequency synthesizer 14. Synthesizer 14 has two outputs, one at 247 KHz, the frequency of the SCR generator 12 and one at 100 MHz. The 100 MHz output serves as a frequency reference for a 6 GHz transmit local oscillator 16.

The 247 KHz output from transmit synthesizer 14 is an input to receive frequency synthesizer 18. Synthesizer 18 has a 100 MHz output which drives the receive local oscillator 20. The frequency 100 MHz is used for simplicity in this description. The 100 MHz outputs of the two synthesizers will not be at the same frequency. The actual outputs will fall between 98 and 106 MHz depending upon mandated radio frequency channel spacing, which dictates a particular frequency differential between the transmit and receive frequencies at the 6 GHz level.

As will be described further in connection with FIG. 2, transmit synthesizer 14 is phase locked to the output of SCR frequency generator 12, and receive synthesizer 18 is phase locked to the 247 KHz output of the transmit synthesizer 14. As a result, in normal operation, the nominal 100 MHz frequency inputs to local oscillators 16 and 20 have a selected, fixed relationship between them. They share the same frequency stability, which is based on the ultra stable SCR frequency generator 12.

Figure 2:
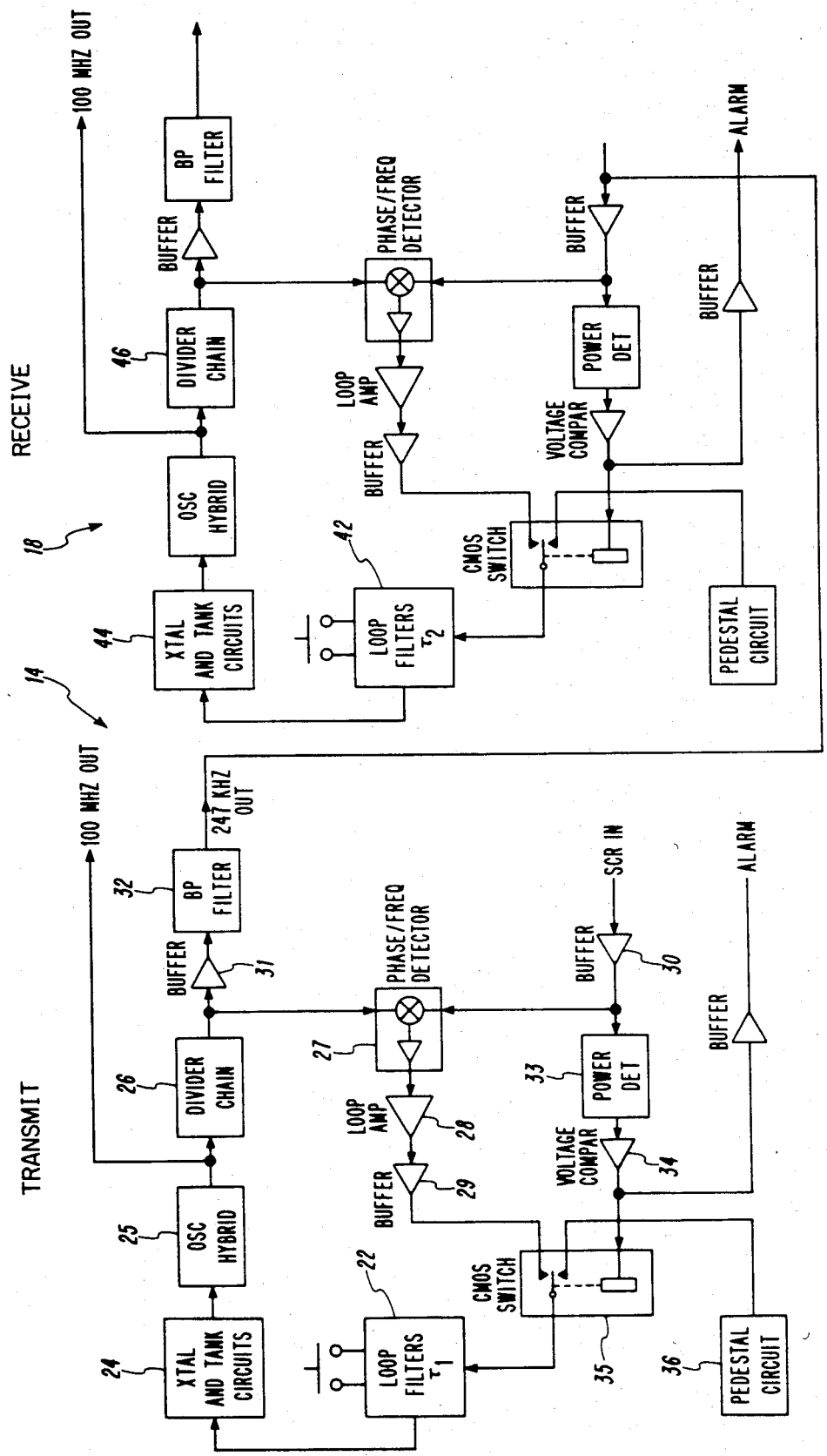
FIG. 2 is a block diagram of frequency synthesizers of FIG. 1.

FIG. 2 illustrates details of transmit synthesizer 14 and receive synthesizer 18. The two synthesizers can have the same circuit design, except for parameters of phase locked loop filters 22 and 42. With reference to transmit synthesizer 14, the crystal and its tank circuits 24, oscillator hybrid 25, divider chain 26, phase/frequency detector 27, loop amplifier 28, buffer amplifier 29 and loop filters 22 form a phase locked loop in accordance with design principles which are well understood in the art.

The output of SCR frequency generator 12 is input through buffer amplifier 30 of transmit synthesizer 14 to phase/frequency detector 27 of the phase locked loop. The 100 MHz output from synthesizer 14 is taken at the output of oscillator hybrid 25. The 247 KHz output is derived farther along in the loop from the output of divider chain 26 and operated upon by buffer amplifier 31 and bandpass filter 32. By the action of the phase locked loop, the 100 MHz and 247 KHz outputs are phase locked to the SCR frequency generator output.

In the transmit synthesizer 14, the SCR frequency generator input is monitored by a power detector 33. The output of the power detector is compared to a reference by a voltage comparator 34. If the SCR generator fails, this is detected by power detector 33, and voltage comparator 34 actuates a switch 35. The action of switch 35 is to break the phase locked loop and connect a fixed voltage from pedestal circuit 36 to loop filters 22. This causes the frequency generating circuitry of the loop to operate free running. An acceptable error rate for the free running mode of the synthesizer is $3 \times 10^{-6}$ parts per year.

As can be seen in FIG. 2, the receive synthesizer 18 is phase locked to the 247 KHz output of the transmit synthesizer 14. Therefore, if the SCR frequency generator 12 fails, receive synthesizer 18 will exhibit the same error rate as the transmit synthesizer.

For a given free running error rate, the error in the synthesizer frequency at the time of SCR failure will depend partly upon how long it has been since the synthesizer was adjusted. In addition, even though the crystal circuits 24 and 34 are preferably provided with heaters and heater controls, temperature conditions can nevertheless influence the frequency shift.

Assuming, a total error of $2 \times 10^{-6}$ parts in the outputs of the synthesizers 14 and 18, then the receive and transmit local oscillators 20 and 16 would each experience a $2 \times 10^{-6}$ parts shift. If, for example, the receive local oscillator operates at $6252 \times 10^6$ Hz, an increase in frequency of $2 \times 10^{-6}$ parts would result in a local oscillator frequency of 6252.012504 MHz. The same error rate for a transmit local oscillator operating at $6000 \times 10^6$ Hz would result in a local oscillator output of 6000.012 MHz.

A received RF signal at 6326 MHz into downconverter 19 would result in an IF signal at 73.987496 MHz (6326−6252.012504). This signal applied to upconverter 21, receiving the upwardly shifted frequency from transmit local oscillator 16 would result in a transmitted RF signal at 6073.999496 MHz (6000.012+73.987496).

The normal transmit RF frequency is 6074 MHz. Accordingly, the error (6074−6073.999496) is .000504 MHz, or 504 Hz. This is well within the limits of a receive terminal demodulator.

The choice of the time constants for loop filters 22 and 42 of FIG. 2 can be a significant factor in the performance of the system according to the invention. These time constants must be slow enough, so that they do not track noise in the reference frequency inputs, such as edge jitter from divider chains 26 and 46. In addition, they must not respond too quickly to the loss of the SCR frequency generator output, or there will occur a significant frequency error and signal dropout.

The time constant of loop filters 22 must be fast enough to track changes in the output of the SCR frequency generator 12. By the same token, the time constant of loop filters 42 must be fast enough to track changes in the 247 KHz output of transmit synthesizer 14. Preferably, the time constant of loop filters 42 is greater than that for loop filters 22. In a preferred embodiment, the receive synthesizer 18 filters had a time constant of 0.4 Hz, while the transmit synthesizer 14 had loop filter time constants of 0.01 Hz.

With the system as described, the repeater is able to sustain the loss of the ultra stable SCR frequency generator, while receiving and transmitting satisfactorily temporarily until the SCR generator can be repaired.

We claim:

1. A system for maintaining an accurate frequency source for controlling a plurality of converter stages in a single sideband repeater, comprising:
    a station control reference (SCR) frequency generator;
    a first local oscillator frequency synthesizer to provide a first output frequency for controlling one of said converter stages, including means for phase locking to the output of the SCR frequency generator in normal operation and free running upon failure of the SCR frequency generator;
    a second local oscillator frequency synthesizer to provide a second output frequency for controlling a second one of said converter stages, including means for phase locking to an output of said first synthesizer,
    said output frequencies having a selected, fixed relationship between them and having sufficient accuracy to operate temporarily upon failure of said SCR frequency generator.

2. The system of claim 1, wherein said first synthesizer includes means for performing said phase locking thereof in accordance with a first time constant, and said second synthesizer includes means for performing the phase locking thereof in accordance with a second time constant, said second time constant being faster than said first time constant.

3. The system of claim 1, wherein said means for phase locking of said first synthesizer includes means for tracking fast enough to follow the frequency output of the SCR generator and tracking slow enough to phase lock properly in the presence of noise and make a satisfactory transition to free running upon failure of the SCR frequency generator, and
    the phase locking means of said second synthesizer includes means for tracking faster than said means for tracking of the first synthesizer.

4. The system of claim 1, wherein each of said frequency synthesizers includes a crystal oscillator and a frequency divider chain, all operating at frequencies substantially below microwave frequencies, thereby facilitating changing the output frequency of either synthesizer.

5. The system of claim 1, wherein said means for phase locking the second frequency synthesizer to the output of the first synthesizer includes means for conducting a signal at a frequency substantially below microwave frequencies, whereby said synthesizers need not be colocated.

* * * * *